Patented Nov. 1, 1949

2,486,566

UNITED STATES PATENT OFFICE 2,486,566

METHOD OF MARKING GLASS

Norbert J. Kreidl, Irondequoit, and Lewis P. Ohliger, Brockport, N. Y., assignors to Bausch & Lomb Optical Company, Rochester, N. Y., a corporation of New York No Drawing. Application March 17, 1945
Serial No. 583,398

4 Claims. (Cl. 117—33.5)

This invention relates to methods of applying to optical glass articles a permanent marking as, for example, a trade-mark, or other identifying symbol, of such a character as to be normally invisible, or substantially so, but capable of being temporarily developed into visible form for purposes of inspection.

It has been proposed in the known art to accomplish such marking in various ways, but in such known ways the marking has objectionably altered the characteristics of the glass, or has not been normally invisible to the desired degree, or capable of being rendered visible by convenient means, or has required expensive, complicated or impracticable methods, so that such prior known ways of marking have not been entirely satisfactory.

One object of the present invention is to provide a more simple and practical method for applying to optical glass a permanent mark which is normally completely invisible when illuminated by ordinary daylight or artificial light, but is capable of being temporarily developed to distinct visibility for purposes of inspection.

Another object is to provide a method of the above character capable of being employed in a practicable way as, for example, in the quantity production of lenses, with a minimum of labor and expense.

Another object is to provide such a method in which the applied mark is adapted to be quickly and conveniently developed for purposes of inspection.

A further object is to provide lenses or other optical glass articles having the improved marking afforded by the above described method.

To these and other ends the invention resides in certain improvements and novel method steps, all as will be hereinafter more fully described, the said steps and novel features being pointed out in the claims at the end of the specification.

The common glasses are believed to comprise a network of strongly bonded silicon and oxygen atoms with monovalent alkaline oxides, such as the oxides of sodium and potassium, in which the alkaline elements are less strongly bonded to the basic network by oxygen linkages. It has been found that the composition of the surface of such a glass can be altered by heating it under exposure to certain reagents, such as metallic salts, during which treatment the monovalent alkaline elements in the glass, such as sodium ions, are replaced by the electropositive metallic atoms or ions of the treating reagents, the rate of such interchange or interdiffusion of the metal for the alkaline elements having been found to depend upon the nature of the compositions employed and the time, temperature and other conditions of treatment.

Such penetration of the glass by metallic atoms from the treating reagent may be conducted with such intensity and resulting density of the atoms in the glass as to effect a distinct change in the index of refraction of the glass at such treated portions, and the development of a distinctly visible color in the glass, so as to be unsuitable for the purposes of the present invention. It has been found that those treating reagents which have a high rate of decomposition at a temperature at which the diffusion rate of the metal atoms into glass is high, tend to produce an intensive or dense penetration of the ions into the glass of the character referred to above. It has also been found that the depth to which such penetration of the glass proceeds increases with an increase in the duration or temperature of the treatment.

Our invention involves in a general way the above described replacement of monovalent alkaline elements of the glass by metallic atoms, but in a method modified and combined with certain other discoveries which we have made. We have found that all optical, opthalmic and other relatively pure glasses exhibit some fluorescence when subjected to short wave ultraviolet radiation, due to minor elements added to the composition of the glass, such as antimony and lead. It has been found that copper introduced into the glass from certain cupric salts gives rise to a fluorescence which is brilliant enough to become impressively visible on the less conspicuous fluorescent background of most optical and other pure glasses. As in the case of the salts of noble metals, the salts of copper tend generally to have a high rate of decomposition at a temperature at which the rate of diffusion into glass, as described above, is high. We have found unexpectedly, however, contrary to this general characteristic, that certain salts of copper hereafter specified are exceptional in behavior as regards such decomposition and, on the contrary, have a low rate of decomposition at a temperature at which the diffusion rate of copper into glass is high, as well as being substantially insoluble and stable when compounded with other substances to form treating reagents.

Our invention involves the discovery of these unexpected characteristics and suitable ways and means for utilizing them, as well as the useful products which they afford.

That is, we have found that a group consisting of the substantially water-insoluble, slowly decomposing cupric salts of the oxygen acids of a number of the elements may be employed in the heat treatment of the glass surface, this group consisting of the borate, metaphosphate, pyrophosphate, orthophosphate, vanadate, arsenate, antimonate, chromate, selenite, molybdate, tungstate and uranate salts of bivalent copper, or the hydrated salts of the same. Within a suitable range of time and temperature conditions, the low rate of decomposition of these salts produces only a low density of copper ions in the glass, as hereafter more fully described, which does not visibly alter the refractive index or appearance of the glass. By selecting suitable time and temperature conditions, however, such penetration of the copper ions into the glass may be continued to a substantial depth, as hereafter more fully described, so as to afford at the treated regions of the glass a fluorescence which is conspicuously visible against the background fluorescence of the other untreated regions. Such treatment of the glass, of course, may be restricted to delimited portions corresponding to letters, figures, words, or other indicia forming a trade mark or other identifying symbol, as well understood in the art. In this way the glass may be readily provided with markings which do not appreciably affect the index or color of the glass and are completely invisible under normal daylight or artificial illumination, but which become conspicuously fluorescent when subjected to short wave ultra-violet irradiation.

In carrying out our method, we prefer to employ one of the above copper salts obtained, for example, by treating the corresponding sodium or potassium salt with the molecular equivalent of cupric sulfate, chloride, nitrate, or carbonate, although the desired cupric salt may be otherwise obtained. As a typical example, we prefer to use cupric chromate obtained by taking 5 g. of copper sulfate ($CuSO_4.5H_2O$) and 3.9 g. of potassium chromate ($K_2CrO_4$), dissolving each in water, mixing, washing and decanting the precipitate which is dried at 50° C. over night, and ground fine in a mortar. In another way of carrying out our invention, cupric tungstate is prepared by mixing aqueous solutions of 7.5 g. $CuSO_4.5H_2O$ and 9.9 g. $NaWO_4.2H_2O$, washing, decanting and drying the precipitate and grinding it fine in a mortar, as above.

One of the above copper salts is mixed with a carrier substance, such as oil, grease, clay slips, titania, or the like, the salt being substantially insoluble and stable against any reaction with any solvent or moisture in the carrier substance which might form a solution injuriously affecting the surface of the glass. In preparing the paste, we prefer to take 95% of the cupric salt and 5% of titania, for example, and add sufficient anhydrous lanolin to make a paste of proper consistency for application to the glass with a rubber stamp, as required by the temperature at the time of application.

The glass to be marked must be very clean, for which purpose it is preferably dipped in chromic acid and washed. The paste is applied to a desired portion of the glass with a rubber stamp and the glass article is then baked in an oven within time and temperature conditions ranging anywhere between the limits of one hour at 350° C. to three minutes at 600° C., the time varying inversely with the temperature and both with the desired intensity of marking. We have found, for example, that in the case of copper ions in crown glass, by the treatment hereafter described, a density may be obtained of not more than substantially 3% by weight of copper ions to glass in the treated layer and a penetration to a depth of 10 to 20 microns which does not visibly affect the appearance of the glass under normal illumination, but affords an impressively visible marking when irradiated with short wave ultra-violet light, and the desirable density and depth of penetration of the metallic ions, under other conditions, may be readily determined by suitable tests, as well understood in the art.

We have found, for example, in marking spectacle crown glass, that treatment of the glass with cupric pyrophosphate may be advantageously accomplished by subjecting it for five (5) minutes to an oven temperature of 500° C. In using cupric borate we have found treatment from five (5) to thirty (30) minutes at an oven temperature between 450° and 500° C. to be satisfactory. Glass has been successfully marked with cupric chromate paste by treatment for thirty (30) minutes at an oven temperature of 430° C. The optimum time and temperature may be readily found in each particular case. After cooling, the glass is washed in water, or weak acid.

A mark applied to an ophthalmic lens, or other glass article, as described, may be made sharply visible by subjecting the article to irradiation by short wave ultra-violet rays from an ordinary ultra-violet lamp emitting rays ranging in length between 2000 and 5000 angstrom units. The lamp is equipped with a shield and filter which absorbs all visible rays and transmits ultra-violet rays between 2500 and 4000 units. The irradiation of the glass article in these rays causes the delimited regions subjected to treatment as above to fluoresce vividly against the lower background fluorescence of the other untreated regions, so as to render the marking distinctly visible. The glass article is preferably covered by a filter which stops the ultra-violet rays to prevent injury to the eye of the observer, but transmits the visible, long or fluorescent rays, having a wave length of, say, 5500 units. Such viewing apparatus is simple and inexpensive in character, and the marking of the glass article is quickly, impressively and conveniently developed by irradiation in such an apparatus.

The above method and equipment and materials for carrying it out are comparatively simple and inexpensive and convenient to manipulate and produce a marking which is permanent and adapted to be quickly and conveniently developed in conspicuous form for observation by merely irradiating the glass article in the simple viewing apparatus described.

It will thus be seen that the invention accomplishes its objects, and while it has been herein disclosed by specific reference to the details of preferred method steps, materials and apparatus, such disclosure is intended in an illustrative, rather than a limiting sense, as it is contemplated that various modifications in the steps and means employed will occur to those skilled in the art, within the spirit of the invention and the scope of the appended claims.

We claim:

1. The method of marking glass having a polished surface comprising the steps of applying to a delimited portion of said surface a cupric salt selected from the group consisting of the borate, metaphosphate, pyrophosphate, orthophosphate, vanadate, arsenate, antimonate, chromate, selenite, molybdate, tungstate and uranate, and the hydrates thereof, and heating the same to cause ions normally present in a layer of said glass adjacent said surface to be replaced by copper ions in a low and normally invisible degree of density but to a depth of penetration capable of visible fluorescence against the surrounding portions of said glass when subjected to short wave ultra-violet irradiation.

2. The method of marking glass having a polished surface comprising the steps of applying to a delimited portion of said surface a substantially water-insoluble, slowly decomposing cupric salt selected from the group consisting of the borate, metaphosphate, pyrophosphate, orthophosphate, vanadate, arsenate, antimonate, chromate, selenite, molybdate, tungstate and uranate, and the hydrates thereof, and heating the same to cause ions normally present in a layer of said glass not less than approximately ten microns deep adjacent said surface to be replaced by copper ions to a normally invisible density in said layer of not more than substantially 3% by weight of copper ions to glass, for producing at said delimited portion a fluorescence visible against the surrounding portions of said glass when subjected to short wave ultra-violet irradiation.

3. The method of marking glass having a polished surface comprising the steps of applying to a delimited portion of said surface a cupric salt selected from the group consisting of the borate, metaphosphate, pyrophosphate, orthophosphate, vanadate, arsenate, antimonate, chromate, selenite, molybdate, tungstate and uranate, and the hydrates thereof, and subjecting the same to heat treatment at a temperature and for a corresponding time period substantially within the range from a temperature of 350° C. for one hour to a temperature of 600° C. for three minutes, to cause ions normally present in a layer of said glass not less than approximately ten microns deep adjacent said surface to be replaced by copper ions to a density in said layer of not more than substantially 3% by weight of copper ions to glass, for producing a fluorescence visible against the surrounding portions of said glass when subjected to short wave ultra-violet irradiation.

4. The method of marking glass comprising monovalent alkaline oxides and having a polished surface comprising the steps of applying to a delimited portion of said surface a compound having as its principal active ingredient a substantially water-insoluble, slowly decomposing cupric salt selected from the group consisting of the borate, metaphosphate, pyrophosphate, orthophosphate, vanadate, arsenate, antimonate, chromate, selenite, molybdate, tungstate and uranate, and the hydrates thereof, subjecting the same to heat treatment in an oven for a period substantially within the range from five to thirty minutes and at a temperature substantially within the range from 400° C. to 600° C. and thereby replacing monovalent alkaline elements of said oxides in a layer not less than approximately ten microns deep adjacent said surface by copper ions to a density in said layer of not more than substantially 3% by weight of copper ions to glass, for producing a fluorescence visible against the surrounding portions of said glass when subjected to short wave ultra-violet irradiation.

NORBERT J. KREIDL.
LEWIS P. OHLIGER.

REFERENCES CITED

The following references are of record in the file of this patent:

UNITED STATES PATENTS

| Number | Name | Date |
|---|---|---|
| 1,217,490 | Northwood | Feb. 27, 1917 |
| 1,302,353 | Friedrich | Apr. 29, 1919 |
| 1,475,473 | Drescher | Nov. 27, 1923 |
| 1,592,429 | Kraus | July 13, 1926 |
| 1,899,760 | Kreidl | Feb. 28, 1933 |
| 2,030,440 | Fritze et al. | Feb. 11, 1936 |
| 2,056,809 | Smith | Oct. 6, 1936 |
| 2,075,446 | Leibig | Mar. 30, 1937 |
| 2,245,783 | Hyde | June 17, 1941 |
| 2,270,307 | Karnes | Jan. 20, 1942 |
| 2,303,756 | Nordberg et al. | Dec. 1, 1942 |
| 2,333,329 | Miglarese | Nov. 2, 1943 |
| 2,340,013 | Nordberg et al. | Jan. 25, 1944 |
| 2,355,746 | Nordberg et al. | Aug. 15, 1944 |
| 2,422,472 | Dalton | June 17, 1947 |